(12) United States Patent
Qin et al.

(10) Patent No.: US 11,388,423 B2
(45) Date of Patent: Jul. 12, 2022

(54) REGION-OF-INTEREST BASED VIDEO ENCODING

(71) Applicant: Alibaba Group Holding Limited, Grand Cayman (KY)

(72) Inventors: Minghai Qin, Hangzhou (CN); Sicheng Li, Hangzhou (CN); Guanlin Wu, Hangzhou (CN); Tae Meon Bae, Hangzhou (CN); Yen-kuang Chen, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 16/827,578

(22) Filed: Mar. 23, 2020

(65) Prior Publication Data

US 2021/0297678 A1 Sep. 23, 2021

(51) Int. Cl.
*H04N 19/167* (2014.01)

(52) U.S. Cl.
CPC .................. *H04N 19/167* (2014.11)

(58) Field of Classification Search
CPC .................................................. H04N 19/167
See application file for complete search history.

(56) References Cited

U.S. PATENT DOCUMENTS

| | | | | |
|---|---|---|---|---|
| 2008/0152245 A1* | 6/2008 | El-Maleh | ............ | H04N 19/117 382/254 |
| 2015/0181168 A1 | 6/2015 | Pahalawatta et al. | | |
| 2015/0350659 A1* | 12/2015 | Auyeung | ............ | H04N 19/115 375/240.26 |
| 2016/0005182 A1* | 1/2016 | Ashani | ...................... | G06T 7/44 382/173 |
| 2018/0165548 A1* | 6/2018 | Wang | ................... | G06N 3/0454 |
| 2019/0392268 A1* | 12/2019 | Tariq | .................. | G06K 9/00791 |
| 2020/0167586 A1* | 5/2020 | Gao | ..................... | G06K 9/6257 |
| 2021/0081676 A1 | 3/2021 | Kim et al. | | |
| 2021/0082122 A1 | 3/2021 | Takeda et al. | | |
| 2021/0082181 A1 | 3/2021 | Shi et al. | | |
| 2021/0084222 A1 | 3/2021 | Kim | | |
| 2021/0089040 A1 | 3/2021 | Afrouzi | | |
| 2021/0089752 A1 | 3/2021 | Wang et al. | | |
| 2021/0090250 A1 | 3/2021 | Proscia | | |
| 2021/0090608 A1 | 3/2021 | Zhang et al. | | |
| 2021/0097290 A1 | 4/2021 | Yang et al. | | |
| 2021/0097667 A1 | 4/2021 | Barua et al. | | |
| 2021/0099687 A1 | 4/2021 | Shin et al. | | |

* cited by examiner

*Primary Examiner* — Farzana Hossain

(57) ABSTRACT

A video processing unit can include a non-object-based region-of-interest detection neural network, a threshold selection module and a region-of-interest map generator. The non-object-based region-of-interest detection neural network can be configured to receive a video frame and generate a plurality of candidate non-object-based region-of-interest blocks. The threshold selection module can be configured to receive the plurality of candidate non-object-based region-of-interest blocks and identify a plurality of selected region-of-interest blocks based on a predetermined threshold. The region-of-interest map generator can be configured to receive the selected non-object-based region-of-interest blocks and generate a region-of-interest map.

20 Claims, 9 Drawing Sheets

REGION-OF-INTEREST BASED VIDEO ENCODING

BACKGROUND OF THE INVENTION

Numerous techniques are used for reducing the amount of data consumed by the transmission or storage of video. One common technique is to use variable bit rate encoding of video frame data. For example, a first bitrate can be utilized to encode one or more regions of interest (ROI), and a second bitrate can be utilized to encode one or more non-regions of interest.

Referring to FIG. 1, a video processing system, according to the conventional art, is shown. The video processing system can include an artificial intelligence (AI) accelerator 110, a central processing unit 120 and a video encoder 130. In one implementation, the artificial intelligence (AI) accelerator 110 can be a graphics processing unit (GPU). The artificial intelligence (AI) accelerator 110 can include an object-based region-of-interest (OB-ROI) detector neural network 140. The object-based region-of-interest (OB-ROI) detector neural network 140 can receive a stream of video frames 150. The object-based region-of-interest (OB-ROI) detector neural network (NN) 140 can be configured to generate a plurality of candidate object-based region-of-interest (OB-ROI) blocks 160. In one implementation, the object-based region-of-interest (OB-ROI) detector neural network 140 can be a deep neural network (DNN) including a regression network for determining object-based region-of-interest (NOB-ROI) blocks 160 and a classification network for object detection. In one implementation, the candidate object-based region-of-interest (OB-ROI) blocks 160 can include a determined probability of the regions of interest (e.g., confidence score), an object type for the regions of interest, and the like. In one implementation, the associated probability can comprise the probability that the given region of interest comprises at least a portion of an object of a given object type. For example, the object-based region-of-interest (OB-ROI) detector neural network 140 can determine if the memory block includes an object of one of a plurality of object types, and a probability the of object type. Accordingly, the term object-based region-of-interest (OB-RIO) detection as used herein generally refers identification of objects within a data set that also includes identification of an associated object type. Memory blocks that do not include an object of one of the plurality of object types can be classified as a non-region of interest. The memory block may be a 16×16, 64×64, or the like matrix of pixel values. Object classification can consume a substantial amount of processing bandwidth on the artificial intelligence (AI) accelerator. For example, classification of mobilenet_v2 based stream of video frames on a typical graphics processing unit (GPU) can consume approximately 12% of the processing bandwidth of the graphics processing unit (GPU), and a corresponding amount of power consumption.

The central processing unit 120 can include a sorting and non-maximum suppression (NMS) module 170. The sorting and non-maximum suppression (NMS) module 170 can receive the plurality of candidate object-based region-of-interest (OB-ROI) blocks 160. The plurality of candidate object-based region-of-interest (OB-ROI) blocks 160 can comprise a substantial amount of data that can consume a substantial amount of communication bandwidth between the artificial intelligence (AI) accelerator 110 and the central processing unit (CPU) 120, and or consume a substantial amount of power to transmit the data between the artificial intelligence (AI) accelerator 110 and the central processing unit (CPU) 120. The sorting and non-maximum suppression (NMS) module 170 can be configured to sort the candidate object-based region-of-interest (OB-ROI) blocks 160 for each object type based on the associated probability. For example, the plurality of candidate object-based region-of-interest (OB-ROI) blocks 160 can include hundreds, thousands or more candidates that are sorted by the corresponding confidence score of the candidate object-based region-of-interest (OB-ROI) blocks 160. The sorting and non-maximum suppression (NMS) module 170 can also be configured to combine multiple overlapping object-based region-of-interest (OB-ROI) blocks 160 to determine one or more region-of-interest bounding boxes. For example, the candidate memory block (MB) for a given object type with the highest confidence score can be selected as the initial decided bounding box. Each candidate memory block (MB) of the same object type with a next lower confidence score is compared to the current decided bounding box to determine how much they overlap. If the current candidate memory block (MB) overlaps with the current decided bounding box by more than a predetermined amount (e.g., 50%), the current candidate memory block (MB) is disregarded. If the current candidate memory block (MB) overlaps with the current decided bounding box by less than the predetermined amount, the current candidate memory block (MB) is added to the current decided bounding box. The candidate memory blocks (MB) are processed until one bounding box is determined for each object type. Accordingly, the term non-maximal suppression as used herein generally refers to a function that iteratively performs an intersection over union of a plurality of candidate blocks to determine a region-of-interest. The sorting and non-maximum suppression (NMS) can also consume a substantial amount of processing bandwidth on the central processing unit 120. For example, sorting and non-maximum suppression (NMS) of the mobilenet_v2 based stream of video frames on a typical central processing unit such as a Xeon8163 processor can consume approximately 10% of the processing bandwidth of the central processing unit (CPU).

The video encoder 130 can be configured to generate a compressed bit stream 180 based on the determined one or more region-of-interest bounding boxes. In one implementation, the video encoder 130 can be configured to encode the data in the one or more region-of-interest bounding boxes at a first bit rate and one or more non-regions-of-interest at a second bit rate, wherein the first bit rate is greater than the second bit rate. In another implementation, the video encoder 130 can be configured to encode the data in the one or more region-of-interest bounding boxes at a first quality and the one or more non-regions-of-interest at a second quality.

The object-based region-of-interest detection for use with variable rate encoding can be computationally intensive. Accordingly, there is a continuing need for improved variable bit rate encoding of video images.

SUMMARY OF THE INVENTION

The present technology may best be understood by referring to the following description and accompanying drawings that are used to illustrate embodiments of the present technology directed toward region-of-interest based video encoding techniques.

In one embodiment, a video processing unit can include an artificial intelligence accelerator including a non-object-based region-of-interest detection neural network, a threshold selection module, and a region-of-interest map generator. The non-object-based region-of-interest detection neural network can be configured to receive a video frame and generate a plurality of candidate non-object-based region-of-interest blocks. The threshold selection module can be configured to receive the plurality of candidate non-object-based region-of-interest blocks and identify a plurality of selected region-of-interest blocks based on a predetermined threshold. The region-of-interest map generator can be configured to receive the selected non-object-based region-of-interest blocks and generate a region-of-interest map. The artificial intelligence accelerator can optionally also include an object-based region-of-interest detection neural network configured to receive the video frame and generate a plurality of candidate object-based region-of-interest blocks. The artificial intelligence accelerator is configured to selectively generate the plurality of candidate non-object-based region-of-interest blocks by the non-object-based region-of-interest detection neural network or generate the plurality of candidate object-based region-of-interest blocks by the object-based region-of-interest detection neural network. When candidate object-based region-of-interest blocks are generated by the object-based region-of-interest detection neural network, a sorting and non-maximum suppression (NMS) module on a central processing unit can be configured to sort the plurality of candidate object-based region-of-interest blocks for respective object types based on associated probabilities, and combine multiple overlapping object-based region-of-interest blocks to determine one or more region-of-interest bounding boxes for respective object types. A video encoder can differentially encode the video frame to generate a compressed bit stream based on the region-of-interest map or the one or more region-of-interest bounding boxes.

In another embodiment, a method of video processing can include generating a plurality of candidate non-object-based region-of-interest blocks for a video frame. The candidate non-object-based region-of-interest blocks can each include a corresponding confidence score. A plurality of selected region-of-interest blocks comprising candidate non-object-based region-of-interest blocks each having confidence scores greater than a predetermined threshold score can be selected. A region-of-interest map can be generated based on the plurality of selected region-of-interest blocks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
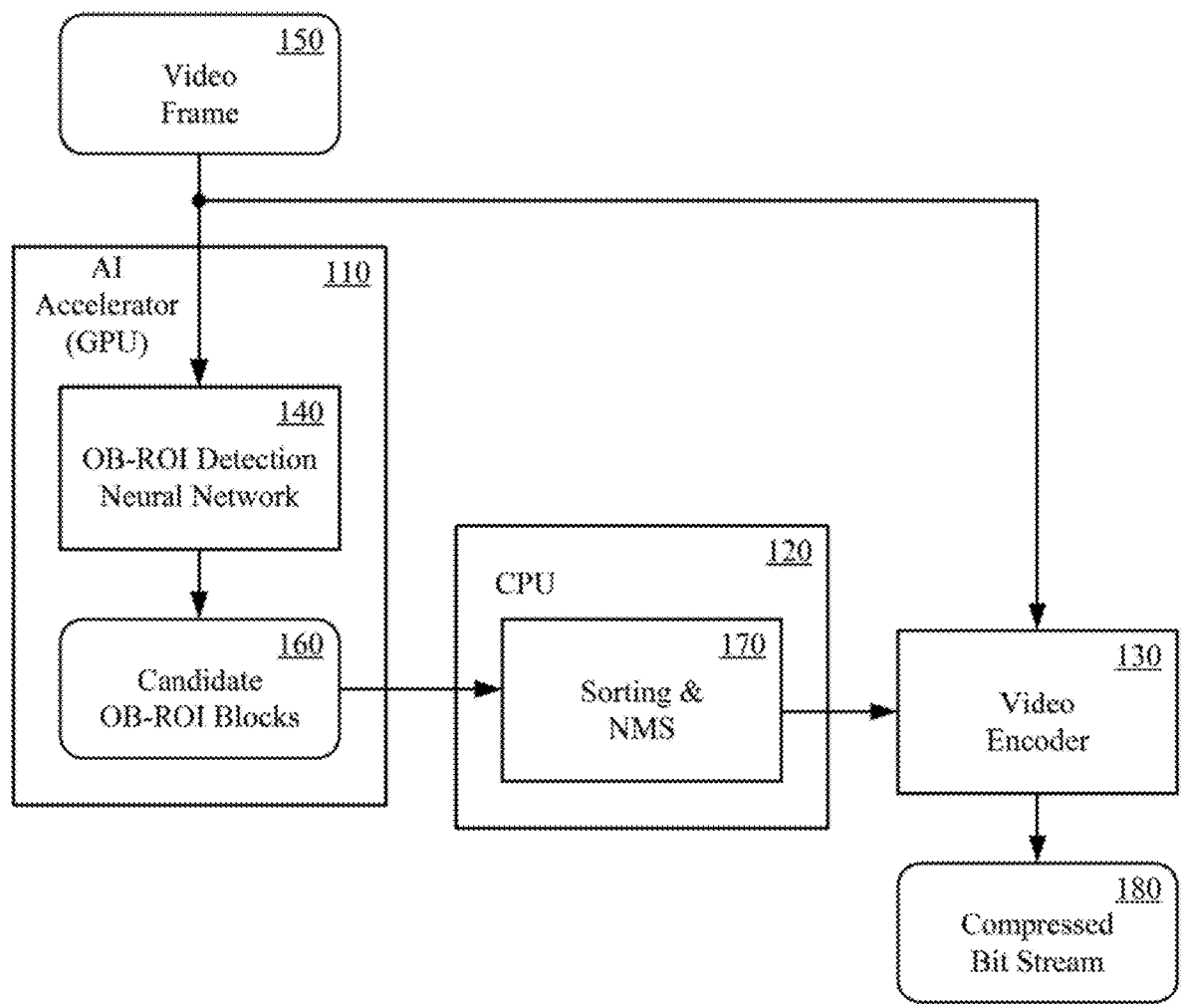
FIG. 1 shows a block diagram of a video processing system, according to the conventional art.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 2:
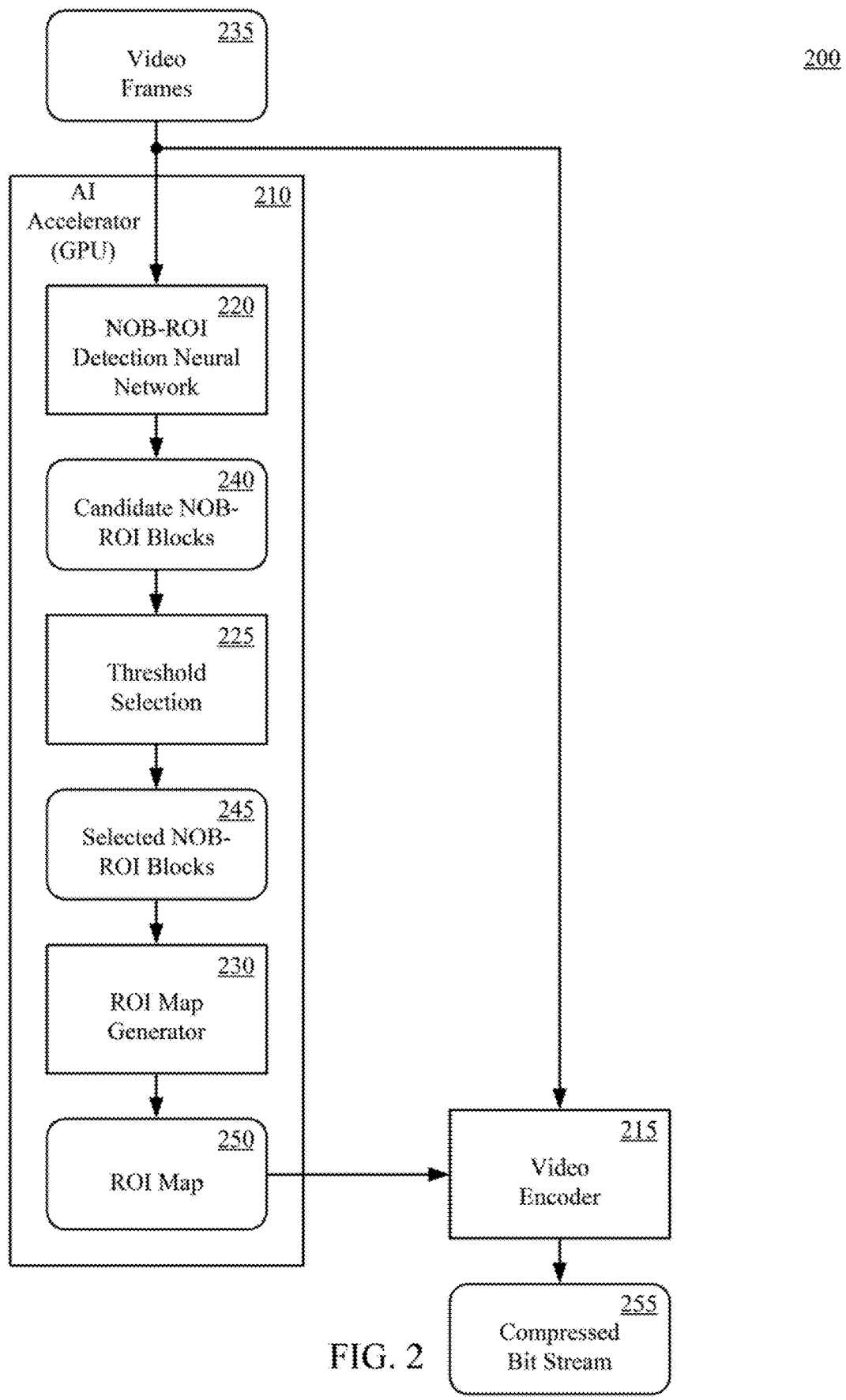
FIG. 2 shows a block diagram of a video processing system, in accordance with aspects of the present technology.
Figure 4A:
FIGS. 4A-4D illustrate an exemplary workflow within an artificial intelligence (AI) accelerator, in accordance with aspects of the present technology.
Figure 4B:
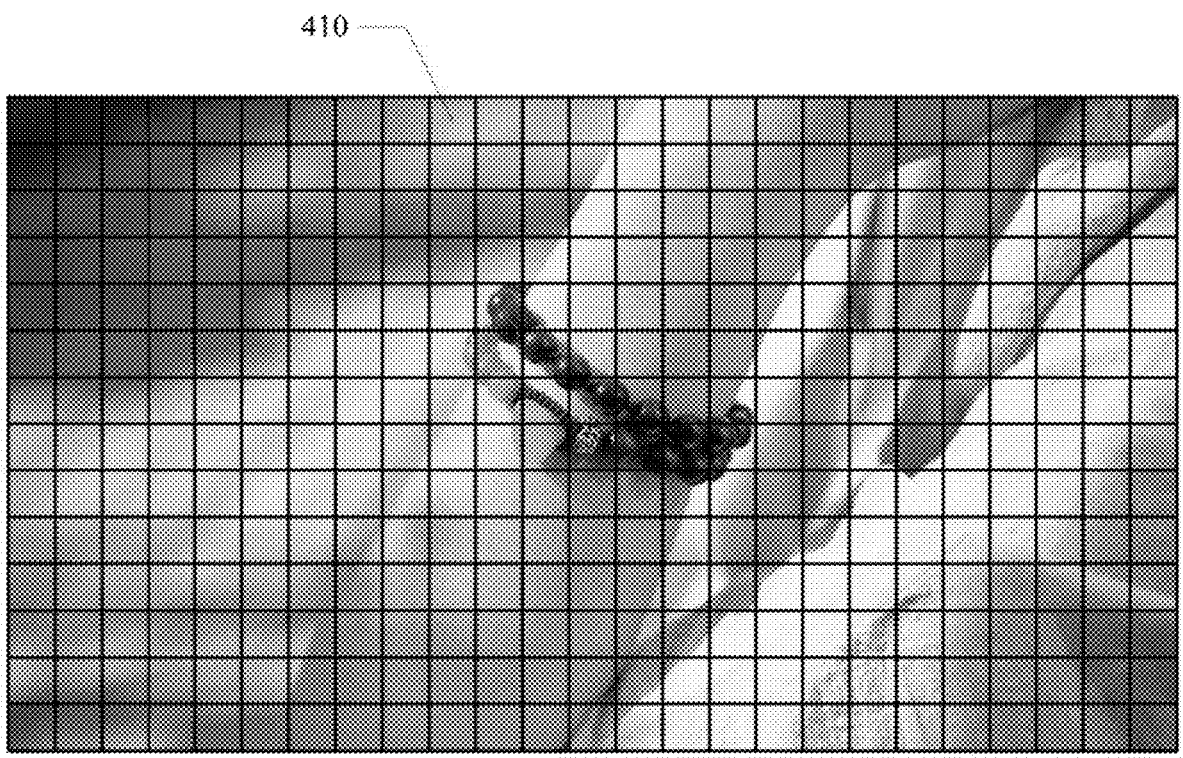

Referring to FIG. 2, a video processing system, in accordance with aspects of the present technology, is shown. Operation of the video processing system will be further explained with reference to FIGS. 4A through 4D, which illustrates an exemplary workflow within the artificial intelligence (AI) accelerator. The video processing system 200 can include an artificial intelligence (AI) accelerator 210 communicatively coupled to a video encoder 215. In one implementation, the artificial intelligence (AI) accelerator 210 can be a graphics processing unit (GPU), a neural processing unit (NPU), a vector processor, a memory processing unit, or the like, or combinations thereof. The artificial intelligence (AI) accelerator 210 can include a non-object-based region-of-interest (NOB-ROI) detection neural network (NN) 220, a threshold selection module 225 and a region-of-interest (ROI) map generator 230. The non-object-based region-of-interest (NOB-ROI) detection neural network (NN) 220 can receive a stream of video frames 215. For example, a video frame as illustrated in FIG. 4A can be received. The non-object-based region-of-interest (NOB-ROI) detection neural network (NN) 220 can be configured to generate a plurality of candidate non-object-based region-of-interest (NOB-ROI) blocks 240. For example, the non-object-based region-of-interest (NOB-ROI) detection neural network (NN) can generate a plurality of candidate non-object-based region-of-interest (NOB-ROI) blocks 410 as illustrated in FIG. 4B. In one implementation, the non-object-based region-of-interest (NOB-ROI) detection neural network (NN) 220 can be a deep neural network (DNN) including a regression network for determining the non-object-based region-of-interest (NOB-ROI) blocks 240 and corresponding probability of interest (e.g., confidence score) for each non-object-based region-of-interest (NOB-ROI) blocks 240. For example, the object-based region-of-interest (OB-ROI) detector neural network 140 can determine a probability that the respective memory blocks (MB) are interesting.

Figures 4C, 4D:
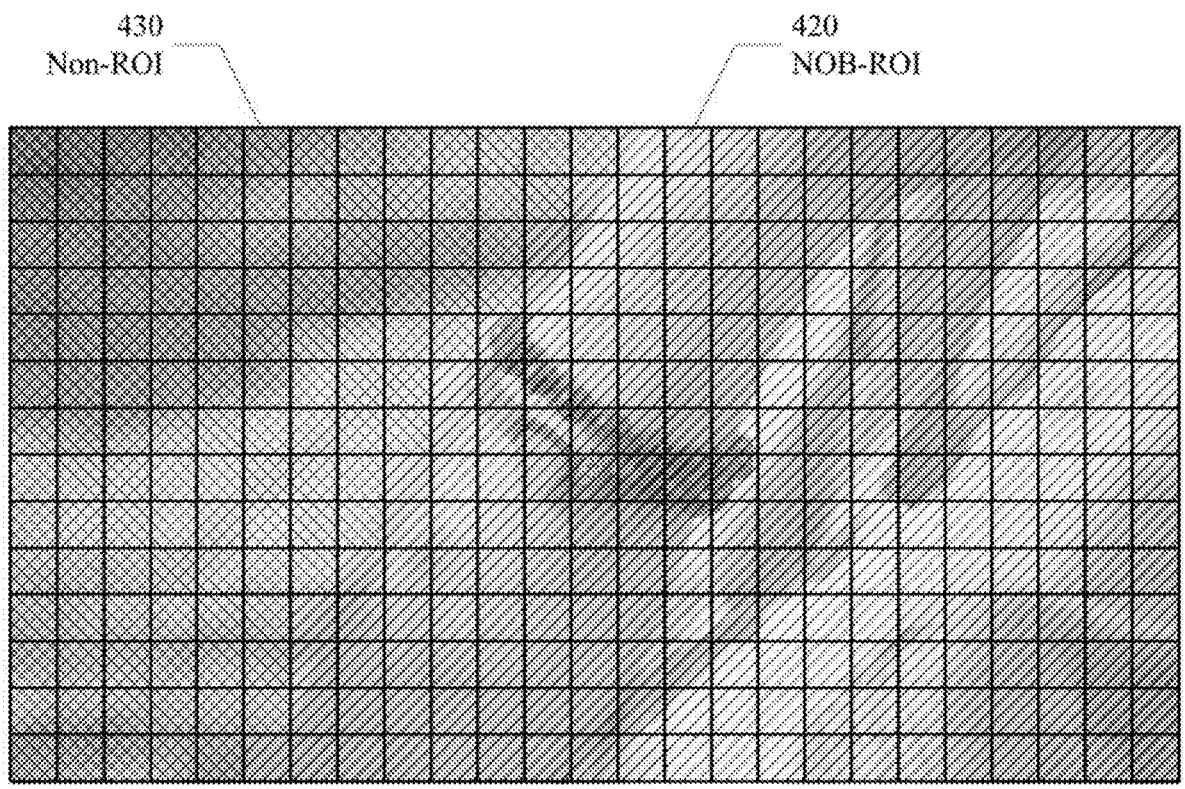

The threshold selection module 225 can receive the plurality of candidate non-object-based region-of-interest (NOB-ROT) blocks 240. The threshold selection module 225 can be configured to identify a plurality of selected region-of-interest (ROI) blocks 245 each of which have a probability greater than a predetermined threshold. For example, memory blocks having a probability greater than a predetermined threshold can be identified as non-object-based region-of-interest (NOB-ROI) blocks 420, as illustrated in FIG. 4C. In one implementation, the non-object-based region-of-interest (NOB-ROI) blocks 420 can correspond to portions of the image including a person. The memory blocks having a probability less than a predetermined threshold can be identified as non-regions of interest 430. The non-regions of interest 423 can correspond to background portions of the image. In one implementation, the threshold selection module 225 can indicate selected memory block (MB) that have a probability, of the regions of interest greater than 1%, or other specified threshold probability. For example, if a given memory block (MB) has a probability greater than the threshold, the given memory block (MB) can be indicated as a non-object-based region-of-interest (NOB-ROI). However, an associated object type is not determined for the non-object-based region-of-interest (NOB-ROI). Accordingly, the term non-object-based region-of-interest (NOB-RIO) detection as used herein generally refers identification of objects within a data set without the identification of an associated object type. If the given memory block (MB) has a probability less than the threshold, the given memory block (MB) can be indicated as a non-region of interest. In one implementation regions-of-interest can correspond to the foreground, and the non-regions-of-interest can correspond to the background in the video frame.

In other implementations, the threshold selection module 225 can be configured to identify region-of-interest (ROI) blocks 245 having a probability in a plurality of a predetermined threshold ranges. For example, memory blocks (MB) having an associated probability of greater than 20% can be identified as a first level of region-of-interest, memory blocks (MB) having an associated probability between 1% and 20% can be identified as a second level of region-of-interest, and memory blocks (MB) having an associated probability less than 1% can be identified as non-regions-of-interest.

In contrast, to the conventional video processing system, the candidate non-object-based region-of-interest (NOB-ROI) blocks 240 are not transmitted to a central processing unit (CPU). In addition, sorting and non-maximum suppression (NMS) of the candidate non-object-based region-of-interest (NOB-ROI) blocks 240 is not performed. Therefore, the video processing system in accordance with aspects of the present technology can reduce communication bandwidth utilization and or reduce power consumption associated with the data transfer. Likewise, the video processing system in accordance with embodiment of the present technology can reduce central processor unit (CPU) utilization and or power consumption associated with processing by the central processor unit (CPU).

The region-of-interest (ROI) map generator module 230 can receive the plurality of selected region-of-interest (ROI) blocks 245. The region-of-interest (ROI) map generator module 230 can be configured to generate a region-of-interest (ROI) map 250 including an indicator for region-of-interest (ROI) blocks that are of interest or not. The region-of-interest (ROI) map can include identifiers of data blocks of a data set and identifiers of selected and non-selected non-object-based region-of-interest (NOB-ROI). For example, the region-of-interest (ROI) map can include an identifier 440 of each memory block in the image, and an identifier 450 indicating if the memory block is a selected block representing a non-object-based region-of-interest (NOB-ROI) 420 or a non-selected block representing a non-region-of-interest 430, as illustrated in FIG. 4D.

Figure 3:
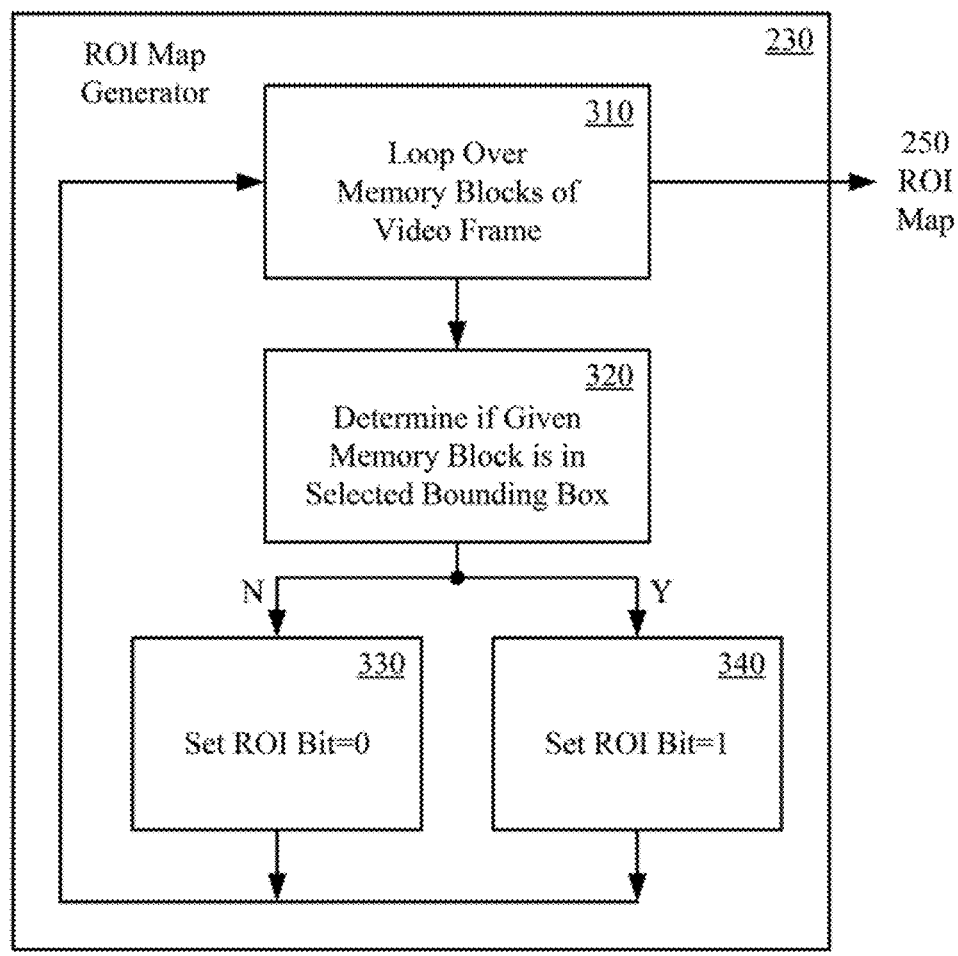
FIG. 3 shows a block diagram of a region-of-interest (ROI) map generator module, in accordance with aspects of the present technology.

Referring now to FIG. 3, a region-of-interest (ROI) map generator module 230, in accordance with aspects of the present technology, is shown. The region-of-interest (ROI) map generator module 230 can loop over the blocks of the video frames 310 to determine if given memory blocks are identified as selected non-object-based region-of-interest blocks. For example, the region-of-interest (ROI) map generator module 230 can determine if the given memory bock is indicated to be a selected block. If the given memory block is not a selected memory block, a corresponding region-of-interest (ROI) bit in the region-of-interest map can be set to a first value 330. If the given memory block is a selected memory block, the corresponding region-of-interest (ROI) bit in the region-of-interest map can be set to a second value 340. For example, if the given memory block (MB) is not a selected memory block, a region-of-interest (ROI) bit in the memory map corresponding to the given memory block (MB) can be set to '0.' If the given memory block (MB) is a selected memory block, a region-of-interest (ROI) bit in the memory map corresponding to the given memory block (MB) can be set to '1.' For multi-level region-of-interest indications, a corresponding multi-bit value in the region-of-interest (ROI) map can be set to a corresponding bit value.

Referring again to FIG. 2, the video encoder 215 can receive the stream of video frames 235 and the region-of-interest (ROI) map 250. The video encoder 215 can be configured to generate a compressed bit stream 255 based on the region-of-interest (ROI) map 250. In one implementation, the video encoder 215 can be configured to encode the memory blocks having a corresponding first region-of-interest (ROI) map bit value (e.g., non-region-of-interest memory blocks) at a first bit rate (e.g., low bit rate) and the memory blocks having a corresponding second region-of-interest (ROI) map bit value (e.g., region-of-interest memory blocks) at a second bit rate (e.g., high bit rate). For example, the non-object-based region-of-interest (NOB-ROI) blocks 410 illustrated in FIG. 4B can be encoded at a high bit rate, while the non-region of interest blocks 420 can be encoded at a lower bit rate. In another implementation, the video encoder 215 can be configured to encode the memory blocks having a corresponding first region-of-interest (ROI) map bit value (e.g., non-region-of-interest memory blocks) at a first quality (e.g., low quality) and the memory blocks, having a corresponding second region-of-interest (ROI) map bit value (e.g., region-of-interest memory blocks) at a second quality (e.g., high quality).

The non-object-based region-of-interest (NOB-ROI) video processing system, in accordance with aspects of the present technology, advantageously reduce the computational workload because the object classification of conventional object-based region-of-interest (OB-ROI) does not need to be performed for variable rate video encoding. In addition, the reduced computational workload can result in a reduction in power consumption by the video processing system 200. The non-object-based region-of-interest (NOB-ROI) can also advantageously be performed entirely in the artificial intelligence (AI) accelerator 210. In non-object-based region-of-interest (NOB-ROI), there is no need for sorting and non-maximum suppression (NMS) and therefore the computational workload of the central processing unit 120 can be reduced. The reduction of the computational workload of the central processing unit 120 can also reduce power consumption in the central processing unit 120. In addition, the bandwidth utilization of one or more communication links between the artificial intelligence (AI) accelerator 210 and the central processing unit 120 is advantageously reduced because data does not need to be transferred from the artificial intelligence (AI) accelerator 210 to the central processing unit 120 for performing sorting and non-maximum suppression (NMS). The reduction in data transmission from the artificial intelligence (AI) accelerator 210 to the central processing unit 120 can also reduce power consumption.

Figure 5:
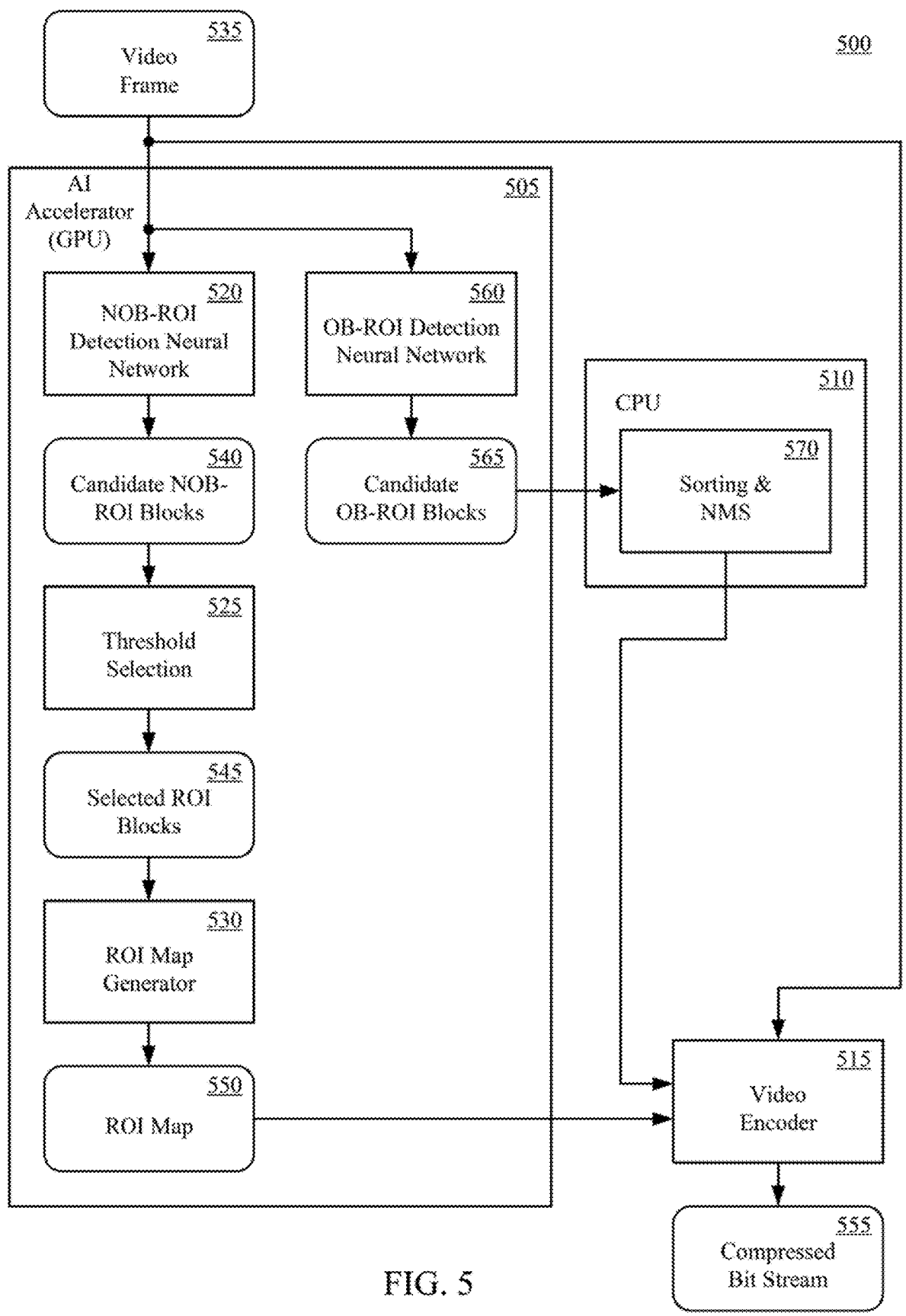
FIG. 5 shows a block diagram of a video processing system, in accordance with aspects of the present technology.

Referring now to FIG. 5, a video processing system, in accordance with aspects of the present technology. The video processing system 500 can include an artificial intelligence (AI) accelerator 505, a central processing unit 510 and a video encoder 515. The artificial intelligence (AI) accelerator 505 and the central processing unit 510 can be selectively configurable to detect non-object-based regions-of-interest (NOB-ROI) or object-based regions-of-interest (OB-ROI) in a stream of video frames.

For non-object-based regions-of-interest (NOB-ROI) detection, the artificial intelligence (AI) accelerator 505 can include a non-object-based region-of-interest (NOB-ROI) detection neural network (NN) 520, a threshold selection module 525 and a region-of-interest (ROI) map generator module 530. The non-object-based region-of-interest (NOB-ROI) detection neural network (NN) 520 can receive a stream of video frames 535. The non-object-based region-of-interest (NOB-ROI) detection neural network 520 can be configured to generate a plurality of candidate non-object-based region-of-interest (NOB-ROI) blocks 540. In one implementation, non-object-based region-of-interest (NOB-ROI) detection neural network 520 can be a deep neural network (DNN) including a regression network for determining the non-object-based region-of-interest (NOB-ROI) blocks 540 and corresponding probability of interest (e.g., confidence score) for each non-object-based region-of-interest (NOB-ROI) block 540. For example, the non-object-based region-of-interest (NOB-ROI) detector neural network 520 can determine a probability that the respective memory blocks (MB) are interesting.

The threshold selection module 525 can receive the plurality of candidate non-object-based region-of-interest (NOB-ROI) blocks 540. The threshold selection module 525 can be configured to identify a plurality of selected region-of-interest (ROI) blocks 545 each of which have a probability greater than a predetermined threshold. In one implementation, the threshold selection module 525 can indicate selected memory block (MB) that have a probability of the regions of interest greater than 1%, or other specified threshold probability. For example, if a given memory block (MB) has a probability greater than the threshold, the given memory block (MB) can be indicated as a region-of-interest. If the given memory block (MB) has a probability less than the threshold, the given memory block (MB) can be indicated as a non-region of interest. In other implementations, the threshold selection module 525 can be configured to identify selected region-of-interest (ROI) blocks 545 having probabilities in a plurality of a predetermined threshold ranges. For example, memory blocks (MB) having an associated probability of greater than 20% can be identified as a first level of region-of-interest, memory blocks (MB) having an associated probability between 1% and 20% can be identified as a second level of region-of-interest, and memory blocks (MB) having an associated probability less than 1% can be identified as non-regions-of-interest.

In contrast, to the conventional video processing system, the candidate non-object-based region-of-interest (NOB-ROI) blocks 540 are not transmitted to a central processing unit (CPU). In addition, sorting and non-maximum suppression (NMS) of the candidate non-object-based region-of-interest (NOB-ROI) blocks 540 is not performed. Therefore, the video processing system in accordance with aspects of the present technology can reduce communication bandwidth utilization and or reduce power consumption associated with the data transfer. Likewise, the video processing system in accordance with embodiment of the present technology can reduce central processor unit (CPU) utilization and or power consumption associated with processing by the central processor unit (CPU).

The region-of-interest (ROI) map generator 530 can receive the plurality of selected region-of-interest (ROI) blocks 545. The region-of-interest (ROI) map generator 530 can be configured to generate a region-of-interest (ROI) map 550 including an indication for region-of-interest (ROI) blocks that are of interest or not. The region-of-interest (ROI) map generator 530 can generate the region-of-interest (ROI) map 550 as described above with reference to FIG. 3.

The video encoder 515 can receive the stream of video frames 535 and the region-of-interest (ROI) map 550. The video encoder 515 can be configured to generate a compressed bit stream 555 based on the region-of-interest (ROI) map 550. In one implementation, the video encoder 515 can be configured to encode the memory blocks having a corresponding first region-of-interest (ROI) map bit value (e.g., non-region-of-interest memory blocks) at a first bit rate (e.g., low bit rate) and the memory blocks having a corresponding second region-of-interest (ROI) map bit value (e.g., region-of-interest memory blocks) at a second bit rate (e.g., high bit rate). In another implementation, the video encoder 515 can be configured to encode the memory blocks having a corresponding first region-of-interest (ROI) map bit value (e.g., non-region-of-interest memory blocks) at a first quality (e.g., low quality) and the memory blocks having a corresponding second region-of-interest (ROI) map bit value (e.g. region-of-interest memory blocks) at a second quality (e.g., high quality).

For non-object-based regions-of-interest (NOB-ROI) detection, the artificial intelligence (AI) accelerator 505 can further include an object-based region-of-interest detector neural network (NN) 560. The object-based region-of-interest detector neural network 560 can receive the stream of video frames 535. The object-based region-of-interest (OB-ROI) detector neural network (NN) 560 can be configured to generate a plurality of candidate object-based region-of-interest (OB-ROI) blocks 565. In one implementation, the object-based region-of-interest (OB-ROI) detector neural network 560 can be a deep neural network (DNN) including a regression network for determining object-based region-of-interest (NOB-ROI) blocks 565 and a classification network for object detection. In one implementation, the candidate object-based region-of-interest (OB-ROI) blocks 565 can include a determined probability of the regions of interest (e.g., confidence score), an object type for the regions of interest, and the like. In one implementation, the associated probability can comprise the probability that the given region of interest comprises at least a portion of an object of a given object type. For example, the object-based region-of-interest (OB-ROI) detector neural network 560 can determine if the memory block includes an object of one of a plurality of object types, and a probability of the object type. Memory blocks that do not include an object of one of the plurality of object types can be classified as a non-regions of interest. Each memory block can be a predetermined matrix size (e.g., 16×16, 64×64, etc.) of pixel values.

The central processing unit 510 can include a sorting and non-maximum suppression (NMS) module 570. The sorting and non-maximum suppression (NMS) module 570 can receive the plurality of candidate object-based region-of-interest (OB-ROI) blocks 565. The sorting and non-maximum suppression (NMS) module 570 can be configured to sort the candidate object-based region-of-interest (OB-ROI) blocks 565 of each object type based on the associated probabilities. For example, the plurality of candidate object-based region-of-interest (OB-ROI) blocks 565 can include hundreds, thousands or more candidates that are sorted by the corresponding confidence score of the candidate object-based region-of-interest (OB-ROI) blocks 565 for each of the different object types. The sorting and non-maximum suppression (NMS) module 570 can also be configured to combine multiple overlapping object-based region-of-interest (OB-ROI) blocks 565 to determine one or more region-of-interest bounding boxes. For example, the candidate memory block (MB) with the highest confidence score can be selected as the initial decided bounding box for a given object type. Each candidate memory block (MB) of the same object type with a next lower confidence score is compared to the current decided bounding box to determine how much they overlap. If the current candidate memory block (MB) overlaps with the current decided bounding box by more than a predetermine amount (e.g., 50%), the current candidate memory block (MB) can be disregarded. If the current candidate memory block (MB) overlaps with the current decided bounding box by less than the predetermined amount, the current candidate memory block (MB) can be added to the current decided bounding box. The candidate memory blocks (MB) are processed until one bounding box is determined for each object type.

For non-object-based regions-of-interest (NOB-ROI) detection, the video encoder 515 can be configured to generate the compressed bit stream 555 based on the determined one or more region-of-interest bounding boxes. In one implementation, the video encoder 515 can be configured to encode the data in the one or more region-of-interest bounding boxes at a first bit rate and one or more non-regions-of-interest at a second bit rate, wherein the first bit rate is greater than the second bit rate. In another implementation, the video encoder 515 can be configured to encode the data in the one or more region-of-interest bounding boxes at a first quality and the one or more non-regions-of-interest at a second quality.

For non-object-based region-of-interest (NOB-ROI) detection, the computational workload of the video processing system 500 can be reduced because the object classification does not need to be performed for variable rate video encoding. In addition, the reduced computational workload can result in a reduction in power consumption by the video processing system 500. The non-object-based region-of-interest (NOB-ROI) can also advantageously be performed entirely in the artificial intelligence (AI) accelerator 505. In non-object-based region-of-interest (NOB-ROI), there is no need for sorting and non-maximum suppression (NMS) and therefore the computational workload of the central processing unit 510 can be reduced. The reduction of the computational workload of the central processing unit 120 can also reduce power consumption in the central processing unit 510. In addition, the bandwidth utilization of one or more communication links between the artificial intelligence (AI) accelerator 505 and the central processing unit 510 is advantageously reduced because data does not need to be transferred from the artificial intelligence (AI) accelerator 505 to the central processing unit 510 for performing sorting and non-maximum suppression (NMS). The reduction in data transmission from the artificial intelligence (AI) accelerator 505 to the central processing unit 510 can also reduce power consumption.

Figure 6:
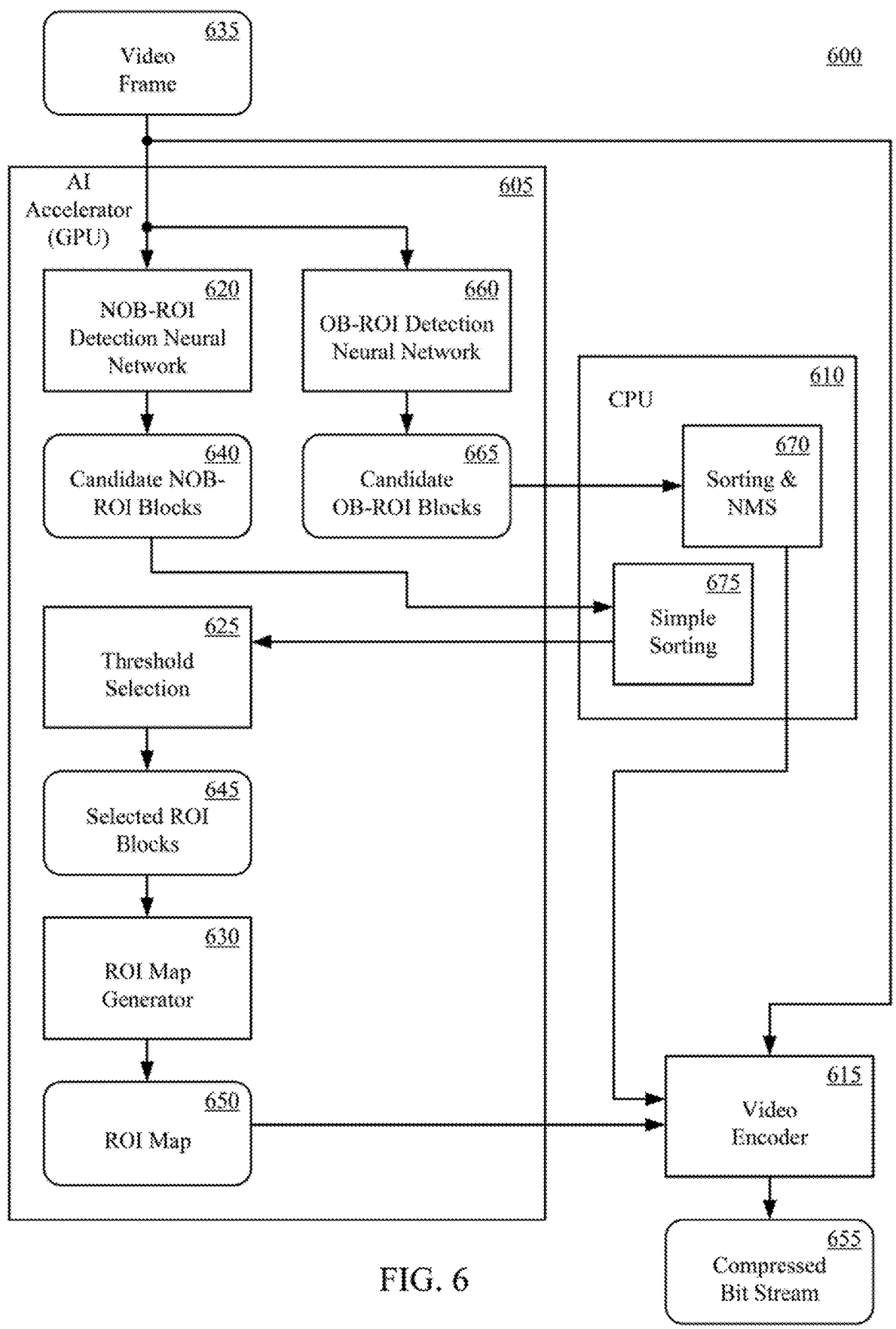
FIG. 6 shows a block diagram of a video processing system, in accordance with aspects of the present technology.

Referring now to FIG. 6, a video processing system, in accordance with aspects of the present technology. The video processing system 600 can include an artificial intelligence (AI) accelerator 605, a central processing unit 610 and a video encoder 615. The artificial intelligence (AI) accelerator 605 and the central processing unit 610 can be selectively configurable to detect non-object-based regions-of-interest (NOB-ROI) or object-based regions-of-interest (OB-ROI) in a stream of video frames.

For non-object-based regions-of-interest (NOB-ROI) detection, the artificial intelligence (AI) accelerator 605 can include a non-object-based region-of-interest (NOB-ROI) detection neural network 620, a threshold selection module 625 and a region-of-interest (ROI) map generator module 630. The non-object-based region-of-interest (NOB-ROI) detection neural network (NN) 620 can receive a stream of video frames 635. The non-object-based region-of-interest (NOB-ROI) detection neural network (NN) 620 can be configured to generate a plurality of candidate non-object-based region-of-interest (NOB-ROI) blocks 640. In one implementation, non-object-based region-of-interest (NOB-ROI) detection neural network 620 can be a deep neural network (DNN) including a regression network for determining the non-object-based region-of-interest (NOB-ROI) blocks 640 and corresponding probability of interest (e.g., confidence score) for each non-object-based region-of-interest (NOB-ROI) block 640. For example, the non-object-based region-of-interest (NOB-ROI) detector neural network 620 can determine a probability that the given memory block (MB) is interesting.

The central processing unit 610 can include a simple sorting module 675. The simple sorting module 675 can receive the plurality of candidate non-object-based region-of-interest (OB-ROI) blocks 640. The simple sorting module 675 can be configured to sort the candidate non-object-based region-of-interest (OB-ROI) blocks 640 based on the associated probabilities. The candidate non-object-based region-of-interest (OB-ROI) blocks sorted based on the associated probabilities can be received by the threshold selection module 625. The threshold selection module 625 can be configured to identify a predetermined number of the plurality of selected region-of-interest (ROI) blocks 645 having the highest associated probability. For example, the 100 memory blocks (MB) with die highest associated probability can be indicated as regions-of-interest. The other memory blocks (MB) can be indicated as a non-regions of interest.

The region-of-interest (ROI) map generator module 630 can receive the plurality of selected region-of-interest (ROI) blocks 645. The region-of-interest (ROI) map generator module 630 can be configured to generate a region-of-interest (ROI) map 650 including an indication for region-of-interest (ROI) blocks that are of interest. The region-of-interest (ROI) map generator 630 can generate the region-of-interest (ROI) map 650 as described above with reference to FIG. 3.

The video encoder 615 can receive the stream of video frames 635 and the region-of-interest (ROI) map 650. The video encoder 615 can be configured to generate a compressed bit stream 655 based on the region-of-interest (ROI) map 650. In one implementation, the video encoder 615 can be configured to encode the memory blocks having a corresponding first region-of-interest (ROI) map bit value (e.g., non-region-of-interest memory blocks) at a first bit rate (e.g., low bit rate) and the memory blocks having a corresponding second region-of-interest (ROI) map bit value (e.g., region-of-interest memory blocks) at a second bit rate (e.g., high bit rate). In another implementation, the video encoder 615 can be configured to encode the memory blocks having a corresponding first region-of-interest (ROI) map bit value (e.g., non-region-of-interest memory blocks) at a first quality (e.g., low quality) and the memory blocks having a corresponding second region-of-interest (ROI) map bit value (e.g., region-of-interest memory blocks) at a second quality (e.g., high quality).

The artificial intelligence (AI) accelerator 605 and central processing unit (CPU) 610 operate substantially the same as described above with reference to FIG. 4 for non-object-based regions-of-interest (NOB-ROI) detection, and therefore will not be described further herein.

For non-object-based region-of-interest (NOB-ROI) detection, the computational workload of the video processing system 600 can be reduced because the object classification does not need to be performed for variable rate video encoding. In addition, the reduced computational workload can result in a reduction in power consumption by the video processing system 600. The non-object-based region-of-interest (NOB-ROI) can also advantageously be performed entirely in the artificial intelligence (AI) accelerator 605. In non-object-based region-of-interest (NOB-ROI), there is no need for sorting and non-maximum suppression (NMS) and therefore the computational workload of the central processing unit 610 can be reduced. The reduction of the computational workload of the central processing unit 610 can also reduce power consumption in the central processing unit 610. In addition, the bandwidth utilization of one or more communication links between the artificial intelligence (AI) accelerator 605 and the central processing unit 610 is advantageously reduced because data does not need to be transferred from the artificial intelligence (AI) accelerator 605 to the central processing unit 610 for performing sorting and non-maximum suppression (NMS). The reduction in data transmission from the artificial intelligence (AI) accelerator 605 to the central processing unit 610 can also reduce power consumption.

Figure 7:
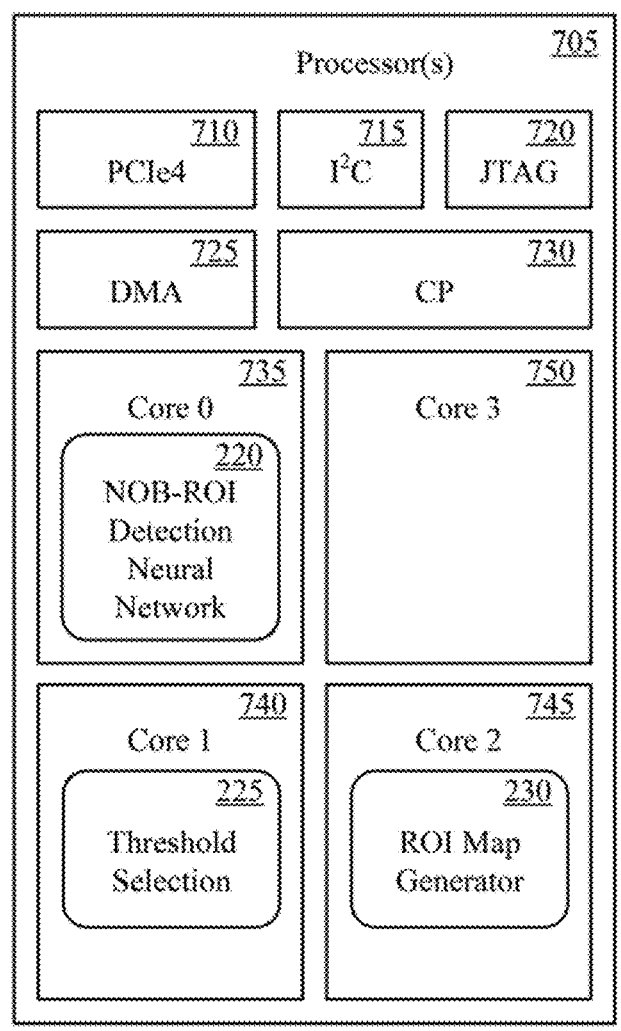
FIG. 7 shows a block diagram of an exemplary processing unit including a video processing unit, in accordance with aspects of the present technology.

Referring now to FIG. 7 an exemplary processing unit including a video processing unit, in accordance with aspects of the present technology, is shown. The processing unit 705 can include one or more communication interfaces, such as peripheral component interface (PCIe4) 710 and inter-integrated circuit (I²C) interface 715, an on-chip circuit tester, such as a joint test action group (JTAG) engine 720, a direct memory access engine 725, a command processor (CP) 730, and one or more cores 735-750. The one or more cores 735-750 can be coupled in a direction ring bus configuration. The one or more cores 735-750 can execute one or more sets of computing device executable instructions to perform one or more functions including, but not limited to, non-object-based region-of-interest (NOB-ROI) detection 220, threshold selection 225 and region-of-interest (ROI) map generation as described above. The one or more functions can be performed on individual core 735-750, can be distributed across a plurality of cores 735-750, can be performed along with one or more other functions on one or more cores, and or the like.

The processor unit 705 can be a central processing unit (CPU), a graphics processing unit (GPU), a neural processing unit (NPU), a vector processor, a memory processing unit, or the like, or combinations thereof. In one implementation, one or more processors 705 can be implemented in a computing devices such as, but not limited to, a cloud computing platform, an edge computing device, a server, a workstation, a personal computer (PCs), or the like.

Figure 8:
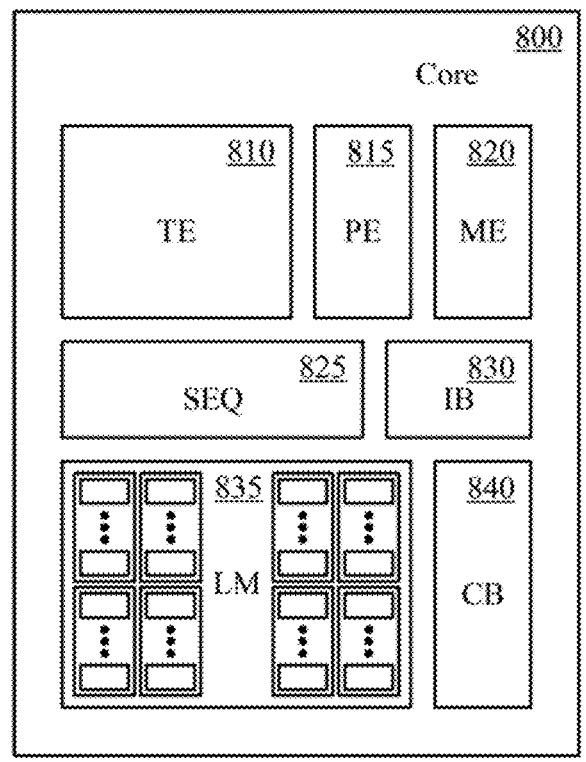
FIG. 8 shows a block diagram of an exemplary processing core, in accordance with aspects of the present technology.

Referring now to FIG. 8, a block diagram of an exemplary processing core, in accordance with aspects of the present technology, is shown. The processing core 800 can include a tensor engine (TE) 810, a pooling engine (PE) 815, a memory copy engine (ME) 820, a sequencer (SEQ) 825, an instructions buffer (IB) 830, a local memory (LM) 835, and a constant buffer (CB) 840. The local memory 835 can be pre-installed with model weights and can store in-use activations on-the-fly. The constant buffer 840 can store constant for batch normalization, quantization and the like. The tensor engine 810 can be utilized to accelerate fused convolution and or matrix multiplication. The pooling engine 815 can support pooling, interpolation, region-of-interest and the like operations. The memory copy engine 820 can be configured for inter- and or intra-core data copy, matrix transposition and the like. The tensor engine 810, pooling engine 815 and memory copy engine 820 can run in parallel. The sequencer 825 can orchestrate the operation of the tensor engine 810, the pooling engine 815, the memory copy engine 820, the local memory 835, and the constant buffer 840 according to instructions from the instruction buffer 830. The processing unit core 800 can provide video coding efficient computation under the control of operation fused coarse grained instructions for functions such as region of interest detection, bit rate control, variable bit rate video encoding and or the like. A detailed description of the exemplary processing unit core 800 is not necessary to an understanding of aspects of the present technology, and therefore will not be described further herein.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A video processing unit comprising:
an artificial intelligence accelerator comprising:
 a non-object-based region-of-interest detection neural network configured to receive a video frame and generate a plurality of candidate non-object-based region-of-interest blocks for the video frame, wherein the plurality of candidate non-object-based region-of-interest blocks is generated by excluding identification of an associated object type of an object within the video frame;
 a threshold selection module configured to receive the plurality of candidate non-object-based region-of-interest blocks and identify a plurality of selected non-object-based region-of-interest blocks based on a predetermined threshold; and
 a region-of-interest map generator configured to receive the plurality of selected non-object-based region-of-interest blocks and generate a region-of-interest map.

2. The video processing unit of claim 1, wherein the non-object-based region-of-interest detection neural network comprises a deep neural network including a regression network configured to determine the plurality of candidate non-object-based region-of-interest blocks and corresponding probabilities of interest of the plurality of candidate non-object-based region-of-interest blocks.

3. The video processing unit of claim 2, wherein the threshold selection module is configured to identify the plurality of selected non-object-based region-of-interest blocks having corresponding probabilities of interest greater than the predetermined threshold.

4. The video processing unit of claim 1, wherein the candidate non-object-based region-of-interest blocks comprise memory blocks of a predetermined matrix size of pixel values.

5. The video processing unit of claim 1, further comprising:
a video encoder configured to receive the video frame and the region-of-interest map and differentially encode the video frame based on the region-of-interest map.

6. The video processing unit of claim 5, wherein the region-of-interest map comprises a plurality of bits corresponding to a plurality of memory blocks of the video frame, wherein a first bit value indicates that a corresponding memory block comprises a region-of-interest and a second bit value indicates that a corresponding memory block comprises a non-region-of-interest.

7. The video processing unit of claim 6, wherein:
memory blocks corresponding to bits of the region-of-interest map having the first bit value are encoded at a first bit rate; and
memory blocks corresponding to bits of the region-of-interest map having the second bit value are encoded at a second bit rate, wherein the second bit rate is less than the first bit rate.

8. The video processing unit of claim 6, wherein:
memory blocks corresponding to bits of the region-of-interest map having the first bit value are encoded at a first quality; and
memory blocks corresponding to bits of the region-of-interest map having the second bit value are encoded at a second quality, wherein the second quality is less than the first quality.

9. A video processing unit comprising:
an artificial intelligence accelerator including:
 a non-object-based region-of-interest detection neural network configured to receive a video frame and generate a plurality of candidate non-object-based region-of-interest blocks for the video frame, wherein the plurality of candidate non-object-based region-of-interest blocks is generated by excluding identification of an associated object type of an object within the video frame;
 a threshold selection module configured to receive the plurality of candidate non-object-based region-of-interest blocks and identify a plurality of selected non-object-based region-of-interest blocks based on a predetermined threshold;
 a region-of-interest map generator configured to receive the plurality of selected non-object-based region-of-interest blocks and generate a region-of-interest map; and
 an object-based region-of-interest detection neural network configured to receive the video frame and generate a plurality of candidate object-based region-of-interest blocks for the video frame; and a central processing unit including:
a sorting and non-maximum suppression (NMS) module configured to receive the plurality of candidate object-based region-of-interest blocks, sort the plurality of candidate object-based region-of-interest blocks for respective object types based on associated probabilities, and combine multiple overlapping object-based region-of-interest blocks to determine one or more region-of-interest bounding boxes for the respective object types.

10. The video processing unit of claim 9, wherein the non-object-based region-of-interest detection neural network comprises a deep neural network including a regression network configured to determine the plurality of candidate non-object-based region-of-interest blocks and corresponding probabilities of interest of the plurality of candidate non-object-based region-of-interest blocks.

11. The video processing unit of claim 10, wherein the threshold selection module is configured to identify the plurality of selected non-object-based region-of-interest blocks having corresponding probabilities of interest greater than the predetermined threshold.

12. The video processing unit of claim 9, wherein the object-based region-of-interest detection neural network comprises a deep neural network including:
a regression network configured to determine the plurality of candidate object-based region-of-interest blocks and corresponding probabilities of interest of the plurality of candidate object-based region-of-interest blocks; and
a classification network configured to determine a corresponding object type of the plurality of candidate object-based region-of-interest blocks.

13. The video processing unit of claim 9, wherein the artificial intelligence accelerator is configured to selectively generate the plurality of candidate non-object-based region-of-interest blocks by the non-object-based region-of-interest detection neural network or generate the plurality of candidate object-based region-of-interest blocks by the object-based region-of-interest detection neural network.

14. The video processing unit of claim 13, further comprising:
a video encoder configured to receive the video frame and receive the region-of-interest map or the one or more region-of-interest bounding boxes, and differentially encode the video frame based on the region-of-interest map or the one or more region-of-interest bounding boxes.

15. The A method of video processing comprising:
generating a plurality of candidate non-object-based region-of-interest blocks for a video frame by excluding identification of an associated object type of an object within the video frame, wherein each of the candidate non-object-based region-of-interest blocks includes a corresponding confidence score;
identifying a plurality of selected non-object-based region-of-interest blocks comprising candidate non-object-based region-of-interest blocks having a confidence score greater than a predetermined threshold score; and generating a region-of-interest map based on the plurality of selected non-object-based region-of-interest blocks.

16. The method of video processing according to claim 15, wherein generating the region-of-interest map comprises:
determining, for memory blocks of the video frame, if a given memory block is a selected non-object-based region-of-interest block;
setting a bit value in the region-of-interest map corresponding to the given memory block to a first value if the given memory block is one of the plurality of selected non-object-based region-of-interest blocks; and
setting the bit value in the region-of-interest map corresponding to the given memory block to a second value if the given memory block is not one of the plurality of selected non-object-based region-of-interest blocks.

17. The method of video processing according to claim 16, further comprising:
differentially encoding the video frame as a compressed bit stream based on the region-of-interest map.

18. The method of video processing according to claim 17, wherein differentially encoding the video frame comprises:
encoding memory blocks corresponding to bits of the region-of-interest map set to the first bit value at a first bit rate; and
encoding memory blocks corresponding to bits of the region-of-interest map set to the second bit value at a second bit rate.

19. The method of video processing according to claim 15, further comprising:
selectively generating the plurality of candidate non-object-based region-of-interest blocks or generating a plurality of candidate object-based region-of-interest blocks, wherein the plurality of candidate object-based region-of-interest blocks includes a corresponding second confidence score and a corresponding object type;
sorting the plurality of candidate object-based region-of-interest blocks of the corresponding object type based on the corresponding second confidence score; and combining multiple overlapping ones of the plurality of candidate object-based region-of-interest blocks to determine one or more region-of-interest bounding boxes.

20. The method of video processing according to claim 19, further comprising:
encoding memory blocks inside the one or more region-of-interest bounding boxes at a first bit rate; and
encoding memory blocks outside the one or more region-of-interest bounding boxes at a second bit rate.

* * * * *